(12) United States Patent
Kasparov et al.

(10) Patent No.: US 8,007,562 B2
(45) Date of Patent: Aug. 30, 2011

(54) SEMI-CONTINUOUS MAGNESIUM-HYDROGEN REDUCTION PROCESS FOR MANUFACTURING OF HYDROGENATED, PURIFIED TITANIUM POWDER

(75) Inventors: Sergey A. Kasparov, Moscow (RU); Andrey G. Klevtsov, Moscow (RU); Aleksandr I. Cheprasov, Moscow (RU); Vladimir S. Moxson, Hudson, OH (US); Volodymyr A. Duz, Hudson, OH (US)

(73) Assignee: ADMA Products, Inc., Hudson, OH (US)

( * ) Notice: Subject to any disclaimer, the term of this patent is extended or adjusted under 35 U.S.C. 154(b) by 451 days.

(21) Appl. No.: 12/317,791

(22) Filed: Dec. 29, 2008

(65) Prior Publication Data

US 2010/0166643 A1    Jul. 1, 2010

(51) Int. Cl.
*C22B 34/12* (2006.01)
*B22F 9/18* (2006.01)

(52) U.S. Cl. ............................ 75/619; 75/10.47; 423/84

(58) Field of Classification Search ................... 75/245, 75/255, 252, 331, 343, 368, 10.1, 10.13, 75/10.14, 10.26, 10.29, 10.46, 10.47, 10.54, 75/10.62, 10.64, 10.65, 611–621, 354–360; 423/69–86, 644–658, 658.2, 658.3

See application file for complete search history.

(56) References Cited

U.S. PATENT DOCUMENTS

| | | | |
|---|---|---|---|
| 2,205,854 A | 6/1940 | Kroll | |
| 2,828,199 A | 3/1958 | Findley | |
| 2,975,049 A | 3/1961 | Jazwinsky | |
| 3,376,107 A | 4/1968 | Oka et al. | |
| 3,880,652 A | 4/1975 | Wenn et al. | |
| 4,373,947 A | 2/1983 | Buttner et al. | |
| 4,468,248 A | 8/1984 | Megy | |
| 4,470,847 A | 9/1984 | Hard et al. | |
| 5,032,176 A | 7/1991 | Kametani et al. | |
| 5,124,122 A | 6/1992 | Wojcik | |
| 5,397,375 A | 3/1995 | O'Donnell et al. | |
| 5,772,724 A | 6/1998 | Inoue et al. | |
| 5,779,761 A | 7/1998 | Armstrong et al. | |
| 5,935,293 A | 8/1999 | Detering et al. | |
| 5,958,106 A | 9/1999 | Armstrong et al. | |
| 6,024,847 A | 2/2000 | Rosenberg et al. | |
| 6,117,208 A | 9/2000 | Sharma | |
| 6,136,060 A | 10/2000 | Joseph | |
| 6,168,644 B1 | 1/2001 | Fukasawa et al. | |
| 6,596,228 B2 | 7/2003 | Rosenberg et al. | |
| 6,638,336 B1 | 10/2003 | Drozdenko et al. | |
| 7,156,974 B2 | 1/2007 | Strezov et al. | |

(Continued)

*Primary Examiner* — Scott Kastler
*Assistant Examiner* — Vanessa Velasquez

(57) ABSTRACT

The cost-effective hydrogenated, purified titanium powder is manufactured by the semi-continuous process including: (a) magnesium-thermic reduction of titanium chlorides at 830-880° C. in the hydrogen atmosphere characterized by the formation of a hollow porous block of the reaction mass having an open cavity in the center of the block, (b) full thermal-vacuum separation of the hollow block from excessive Mg and $MgCl_2$ at 850-980° C. and residual pressure of 26-266 Pa using a multi-step cycle including: (i) purging hydrogen at 800-950° C. into the reactor at the pressure 10 kPa to 24.5 kPa, (ii) directive squeezing-out of a separated liquid phase containing magnesium and magnesium chloride into an additional vessel, and (iii) application of alternate pressure to small portions of the liquid phase in porous titanium compound from different sides which provides removal of the liquid from small pores of the titanium compound and fast evaporation of said liquid, (c) simultaneous hydrogenation and cooling of the titanium sponge down to 600° C. by purging cold hydrogen using multiple recirculation of hydrogen, (d) holding the hydrogenated porous titanium compound in the hydrogen atmosphere at 450-600° C. for 20-70 minutes, (e) removing the hydrogenated porous titanium compound from the reactor, and (f) crushing and grinding the crushed hydrogenated porous titanium pieces into the powder having a predetermined particle size.

6 Claims, 1 Drawing Sheet

SEMI-CONTINUOUS MAGNESIUM-HYDROGEN REDUCTION PROCESS FOR MANUFACTURING OF HYDROGENATED, PURIFIED TITANIUM POWDER

REFERENCED CITED

U.S. Patent Documents

U.S. Pat. No. 2,205,854 June 1940 Kroll . . . 75/84
U.S. Pat. No. 2,828,199 March 1958 Findley . . . 75/611
U.S. Pat. No. 2,975,049 March 1961 Jazwinsky . . . 75/343
U.S. Pat. No. 3,376,107 April 1968 Oka et al. . . . 75/615
U.S. Pat. No. 3,880,652 April 1975 Wenn et al. . . . 75/84
U.S. Pat. No. 4,373,947 February 1983 Buttner et al. . . . 75/228
U.S. Pat. No. 4,468,248 August 1984 Megy . . . 75/615
U.S. Pat. No. 4,470,847 September 1984 Hard et al. . . . 75/84
U.S. Pat. No. 5,032,176 July 1991 Kametani et al. . . . 75/416
U.S. Pat. No. 5,124,122 June 1992 Wojcik . . . 75/10
U.S. Pat. No. 5,397,375 March 1995 O'Donnell et al. . . . 75/368
U.S. Pat. No. 5,772,724 June 1998 Inoue et al. . . . 75/10.13
U.S. Pat. No. 5,779,761 July 1998 Armstrong et al. . . . 75/370
U.S. Pat. No. 5,935,293 August 1999 Detering et al. . . . 75/10.19
U.S. Pat. No. 5,958,106 September 1999 Armstrong et al. . . . 75/370
U.S. Pat. No. 6,024,847 February 2000 Rosenberg et al. . . . 204/243
U.S. Pat. No. 6,117,208 September 2000 Sharma . . . 75/613
U.S. Pat. No. 6,136,060 October 2000 Joseph . . . 75/10.19
U.S. Pat. No. 6,168,644 January 2001 Fukasawa et al. . . . 75/343
U.S. Pat. No. 6,596,228 July 2003 Rosenberg et al. . . . 420/417
U.S. Pat. No. 6,683,336 October 2003 Drozdenko et al. . . . 75/359
U.S. Pat. No. 7,156,974 January 2007 Strezov et al. . . . 205/398

FIELD OF INVENTION

The present invention relates to hydrogenated titanium powder manufactured by the crushing and grinding of porous titanium compound produced by the metallo-thermic reduction of titanium chlorides. More particularly, the invention is directed to the cost-cutting and energy-saving manufacture of purified hydrogenated titanium powder by the improved semi-continuous process of magnesium-reduction of $TiCl_4$ including the vacuum separation (vacuum distillation) of hydrogenated porous titanium compound from magnesium and magnesium chlorides without any hydro-metallurgical treatment of the product.

BACKGROUND OF THE INVENTION

Titanium powder for commercial use is presently produced by a hydride-dehydride (HDH) process, as disclosed in U.S. Pat. No. 6,168,644, by gas atomization, or by the plasma-rotating electrode process, as disclosed in U.S. Pat. No. 6,136,060. Raw materials for HDH process are titanium metal obtained by re-melting and processing titanium sponge, or ready-crushed titanium sponge itself. These raw materials are hydrogenated; then, the brittle hydrogenated titanium is ground to the desired powder size that is dehydrogenated by vacuum heating. Essentially, the titanium powder production is a multi-step, energy-consumable, high-cost industrial process including the manufacture of titanium sponge, which is the most expensive part of the technology.

Numerous disclosures for magnesium-reducing $TiCl_4$ and subsequent processing of the obtained titanium sponge are present in the art, starting from U.S. Pat. No. 2,205,854 granted to Wilhelm Kroll in 1940. Most developments were directed to improve the quality of the sponge by diminishing the final content of magnesium, chlorine, oxygen, and iron contaminants. Various processes have been developed during the last two decades for energy-saving, cost-effective, sponge-related technologies.

The manufacture of titanium powder from reduced titanium sponge or sponge-like product includes (a) magnesium-thermic reduction of titanium chlorides in a reactor, (b) preliminary distillation of the reaction mass to the content of magnesium chloride of 5-12%, (c) cooling of the obtained sponge block in argon, (d) crushing and grinding the sponge into the powder having a particle size of 0-12 mm, (e) preliminary drying of the powder at <250° C., (f) cooling and additional grinding, (g) final distillation of the powder from magnesium chloride residues by vacuum separation, (h) hydro-metallurgical treatment, (i) final drying, and (j) final grinding of the titanium powder.

In spite of saving time and energy in sponge production, this process is not cost-effective when considering titanium powder as the final product. In this process, the first stage of vacuum separation is carried out at 1020° C., which results in a solid sintered block of the reaction mass and increases the time of sponge distillation. Double-stage vacuum separation accompanied by multi-stage drying and grinding increases the process time and electric energy consumption, and significantly decreases the powder productivity. Besides, multi-stage hot drying increases the content of gaseous impurities in the obtained powder.

Periodic removal of exhaust magnesium chloride from the reactor bottom and cooling a reaction interface by argon flow reduced the time of sponge production, but neither the cost nor the energy of the entire process of powder manufacture is gained.

The same result, insignificant to powder cost, was reached in the process disclosed in JP 61012836, 1986 which increases the sponge yield by predetermined blowing of $TiCl_4$ at the temperature of <600° C. under argon into molten magnesium.

The electric power consumption was decreased by 20% using a condensing vessel in the reactor for removing unreacted magnesium and residual magnesium chloride from the reaction zone. This energy savings related only to sponge production and does not reflect on the total production cost because the obtained ductile sponge needs to be hydrated/dehydrated with the repetition of the multi-stage processing.

Productivity of the magnesium-thermic process was increased by the preliminary cleaning of $TiCl_4$ and accelerated the supply into the reactor. This method also related only to the sponge production and results mostly in the sponge quality.

A way of accelerating the distillation stage was offered also. According to this, the oxide impurities are partially soluble in fused $MgCl_2$ at a higher temperature, therefore the reduction process should be carried out at more elevated temperature and simultaneously increase feeding the reactor with $TiCl_4$ to obtain a porous titanium sponge, which facilitates the removal of fused $MgCl_2$ together with oxygen dissolved in it. Unfortunately, the higher temperature results in additional power consumption.

The supply of hot argon through the reaction mass can also speed up the distillation process by vaporizing the magnesium and magnesium chloride in gaseous form, as disclosed in the U.S. Pat. No. 3,880,652. But additional expenses involved with heating and supplying high-temperature argon override the savings on production cost during the distillation stage.

The titanium powder according to the U.S. Pat. No. 6,638,336 granted to Drozdenko et al. is manufactured by (a) magnesium-thermic reduction of titanium chlorides characterized by the formation of a hollow block of the reaction mass having an open cavity in the center of the block, (b) thermal-vacuum separation of the hollow block from excessive Mg and $MgCl_2$ at 850-950° C., (c) cooling of the obtained titanium hollow block in a $H_2$-contained atmosphere at an excessive hydrogen pressure, (d) crushing and grinding the hydrogenated titanium block, and (e) hydro-metallurgical treatment of obtained titanium powder in a diluted aqueous solution of at least one chloride selected from magnesium chloride, sodium chloride, potassium chloride, or titanium chloride. The hydro-metallurgical treatment of titanium powder significantly increases labor and time of the process, but however does not provide the desirable purity of the powder which contains magnesium and chlorine contaminants up to 1%.

The manufacture of high-purity titanium sponge lumps includes crushing the titanium sponge to a particle size of 2-50 mm and heat-treating at a reduced argon pressure of 600-1100° C. Crushing and heat treatment are repeated several times until the desired purity of coarse titanium is reached. This method is ineffective for commonly used titanium, and requires HDH processing to obtain the powder for industrial purposes.

All other known methods of producing titanium powder directly from magnesium-reduced sponge or sponge-like porous titanium compound have the same drawback: cost and energy savings are only realized for one or two stages, but not for the continuous multi-stage process, which makes none of these processes cost-effective.

Not one conventional process comprises the sponge or sponge-like hydrogenated porous titanium compound production adjusted specially to subsequent powder manufacture: sponge lumps are ductile and need to be treated by HDH process.

Also, all processes known from the prior art do not provide high productivity together with the sufficient purification of the hydrogenated titanium compound within one production cycle. All products require additional purification (either by hydration-dehydration or hydrometallurgical treatment) in order to remove impurities, especially magnesium and magnesium chloride to the concentration below 1 wt. %.

OBJECTIVES OF THE INVENTION

The object of the invention is to manufacture pure titanium hydride powder from magnesium-reduced sponge-like hydrogenated porous titanium compound within one production cycle. Any additional hydrometallurgical treatment of the powder produced should be excluded while exhaust materials of the process such as magnesium and magnesium chloride can be utilized readily.

Yet another objective of the present invention is to use the same equipment as used for the manufacture of said hydrogenated porous titanium compound.

It is also an objective to provide the cost-effective and highly-productive manufacture of purified titanium hydride powder from magnesium-reduced hydrogenated porous titanium compound.

The nature, utility, and further features of this invention will be more apparent from the following detailed description, with respect to preferred embodiments of the invented technology.

SUMMARY OF THE INVENTION

While the manufacture of titanium powders using the magnesium-reduction process including vacuum separation followed with additional process of titanium powder purification has previously been contemplated as mentioned above, two main problems have not been solved: (a) the problem of not sufficient purity of the hydrogenated titanium powder that contains about 1 wt. % of magnesium and chlorine impurities, and (b) the problem of low productivity and low cost effectiveness due using a discontinuous, multi-cycle process.

The invention overcomes these problems by offering the semi-continuous and cost-effective process of titanium sponge or sponge-like hydrogenated porous titanium compound (HPTC) reduction with magnesium that includes in the same production cycle the hydrogenation of sponge or sponge-like porous titanium compound (PTC) and the vacuum separation of pure titanium from magnesium and magnesium chloride using pressurized hydrogen to remove waste products of the reaction. Then, the purified HPTC is crushed and ground to obtain the hydrogenated titanium powder contained not more than 0.02 wt. % of magnesium and not more than 0.086 wt. % of magnesium chloride.

In essence, the core of the invention is performing magnesium-thermic reduction of titanium chlorides and full vacuum separation of titanium in the same production cycle, which includes (a) magnesium reduction of titanium tetrachloride in a reactor in the temperature range of 830-880° C. in the hydrogen atmosphere at the pressure of 5-10 kPa and the feeding rate of titanium chlorides in the range 5.3-8 kg/h resulting in the formation of a hollow block of the reaction mass having an open cavity in the center of the block; (b) heating hydrogen in a input pipe connected to a gas compressor using an electric heater and purging hot hydrogen into the reactor for heating the reaction mass to the temperature in the range of 980-1020° C., which is optimal for the followed up vacuum separation and for keeping a uniform temperature along the reactor; (c) full thermal-vacuum separation of PTC in the reaction mass from excessive magnesium and magnesium chloride at 850-980° C. and residual pressure of 26-266 Pa ($10^{-2}$-$10^{-3}$ mm Hg), using a multi-step cycle including: (i) purging hydrogen at 800-950° C. into the reactor at the pressure 10 kPa to 24.5 kPa, (ii) directive squeezing-out of a separated liquid phase containing magnesium and magnesium chloride into an additional vessel, and (iii) application of alternate pressure to small portions of the liquid phase in pores of the titanium compound from different sides which provides removal of the liquid from small pores of PTC and fast evaporation of said liquid; (d) simultaneous hydrogenation and cooling of the PTC down to 600° C. or lower temperature by purging cold hydrogen having temperature 25-35° C. into the reactor for a speedy cooling of the block of reaction mass using multiple recirculation of hydrogen in and out of the reactor, whereby the control of temperature of the block of reaction mass is carried out by adjusting the amount of purged hydrogen; (e) holding the PTC in the hydrogen atmosphere at 450-600° C. for 20-70 minutes using multiple recirculation of hydrogen that has a stable temperature; (f)

directing hydrogen in the gas refrigerator and cooling the reactor down to 150-200° C. using this cold gas; (g) removing the HPTC from the reactor; (h) crushing the hydrogenated titanium compound, and (i) grinding the crushed titanium pieces into the powder having a predetermined particle size.

The operation of full thermal-vacuum separation of the PTC in the reaction mass from liquid magnesium and magnesium chloride includes the following steps: (a) degassing of the reactor down to the pressure 0.1 Pa at the rate not less than 1000 Pa/min and at 980-1020° C. in order to provide the first cycle of vacuum separation, (b) providing the separation cycles "purge-in the hydrogen-degassing-purge-in the hydrogen-degassing" accompanied by alternative directing the hydrogen flow from the top and from the bottom of the reactor in order to provide a repetitive removal of liquid magnesium and magnesium chloride out of the small pores of the PTC, as well as to keep the reaction mass uniformly heated during the separation process, (c) the pressure ratio between hydrogen flows directed from the top and from the bottom of the reactor is 1:2, and the hydrogen used in the cycles "purge-in the hydrogen-degassing-purge-in the hydrogen-degassing" is recycled without an addition of fresh portions of the gas, and (d) continuing said "purge in the hydrogen-degassing-purge in the hydrogen-degassing" cycles until the average magnesium content in the hydrogenated porous titanium compound is in the range of 0.015-0.020 wt. % and the average chlorine content is in the range of 0.070-0.086 wt. %.

BRIEF DESCRIPTION OF THE DRAWING

For the purpose of facilitating an understanding of the invention, there is illustrated in the accompanying drawing a preferred embodiment thereof.

DETAILED DESCRIPTION OF THE INVENTION

Figure 1:
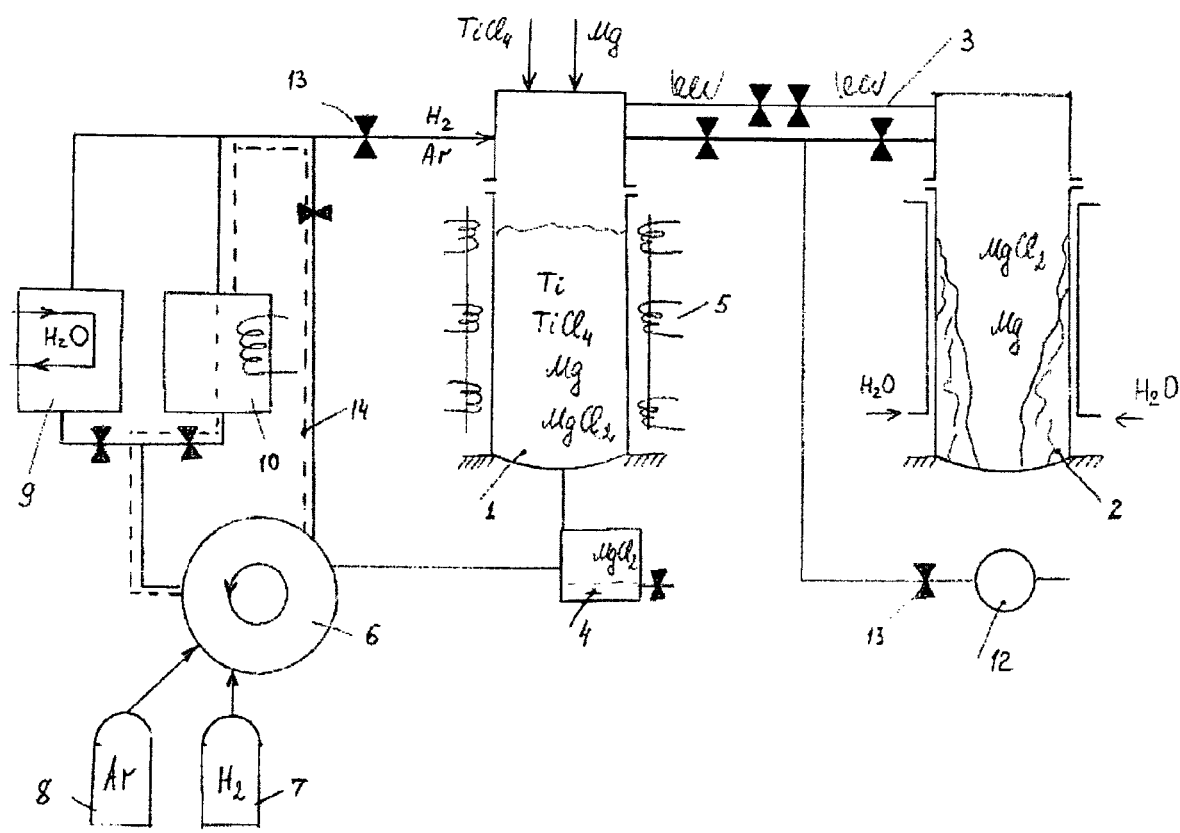
FIG. 1 is a conventional scheme of a plant and a semi-continuous process of the manufacture of hydrogenated, pure titanium powder including magnesium reduction and full vacuum separation of porous titanium compound from liquid magnesium and magnesium chloride followed by the hydrogenation in the same production cycle.

High productivity and energy saving of semi-continuous processing of HPTC that results in the purification of the hydrogenated titanium mass followed by crushing and grinding in order to manufacture the titanium powder with respect to its chemical composition and particle size distribution is achieved by magnesium-thermic reduction and full vacuum separation of PTC from waste reaction products in the same retort. The process is intensified at each stage of the technology: formation of the hollow block of the reaction mass with an open cavity in the center of the block, full vacuum separation at lower temperature, acceleration of the block cooling, whereby the traditional hydro-metallurgical treatment of the powder, that significantly decreases both cost of the process and operational time, is excluded.

The summary process flowsheet is shown in FIG. 1 which illustrates but does not limit the invention. In our innovative process, the magnesium-thermic reduction of the titanium chlorides is carried out at 830-880° C. in the hydrogen atmosphere at the pressure of 5-10 kPa in the reactor retort 1 partially filled with liquid magnesium at a controlled supply of $TiCl_4$ with maximal rate to cut the process duration. The reaction mass is formed on the inner surface of the reactor, in which the surface is permanently contacted with molten magnesium. These process conditions result in the growth of the reaction mass on the inner surface of the reactor and subsequently, in the formation of the hollow block of the reaction mass having the open cavity in the center. Such shape of the reaction mass provides a high rate of magnesium reduction that accelerates the formation of the porous titanium block, and decreases the total duration of the titanium sponge or sponge-like porous titanium compound production process. The shorter time of the process results in significant savings of supplied electric power.

After the operation of reduction and termination of the $TiCl_4$ supply into the retort 1, hydrogen (or the mixture of hydrogen with argon) is purged there under the pressure using a compressor 6. This hydrogen is in preliminary heated by the electric heater 10 to the temperature in the range of 980-1020° C. which provides the maintaining of a uniform temperature along the reactor sufficient to keep magnesium and magnesium chloride in the molten state. Also, this temperature is optimal for the followed up vacuum separation.

The liquid phase of mixed magnesium and magnesium chloride is expelled from the retort 1 under the hydrogen pressure into the separate vessel 4, where this mixture is accumulated and consequently removed for utilization by electrolysis.

Then, the first step of vacuum separation (distillation) of the PTC from the reaction products is started from degassing the reactor 1 down to the pressure 0.1 Pa at the rate not less than 1000 Pa/min and at 980-1020° C. in order to provide the first cycle of vacuum separation. Degassing is made by using the vacuum pump 12, a condenser retort 2, and a heated pipeline 3 for transportation of magnesium vapors and magnesium chloride into the condenser 2. Condensation of magnesium and magnesium chloride vapors takes place in the condenser retort 2 where the said vapors come up from several reactor retorts 1, providing for the semi-continuity of the process and dramatically (up to 10 times) decreases the number of condenser retorts used traditionally in the processes known in the prior art.

The by-pass pipeline 14 of preliminary heating hydrogen is designated for keeping stable temperature of hydrogen in a narrow range at any step of the process. The hydrogen refrigerator 9 is designated for cooling hydrogen and consequently the HPTC in the reactor retort 1 after its hydrogenation, as well as for cooling the final product when the exothermic heat is generated during the hydrogenation.

Electric heaters 5 at different parts and units of the equipment are designated for controlling and keeping optimal temperatures in both retorts 1, 2 and pipelines. These electric heaters for heating re-circulated hydrogen comprise closely packed carbon or graphite rods in order to provide effective convective heating of the gas. Valves and valve gates 13 are used for carrying out all steps of the process in the predetermined sequence. Vessels with hydrogen 7 and argon 8 are designated for supply and recovery of necessary amount of hydrogen in the system because a part of hydrogen is absorbed by titanium porous compound to form the titanium hydride.

The full thermal-vacuum separation of the PTC within the reaction mass from excessive magnesium and magnesium chloride is carried out in the same retort 1 at 850-980° C. and residual pressure of 26-266 Pa ($10^{-2}$-$10^{-3}$ mm Hg). The separation of porous titanium compound is performed simultaneously with the hydrogenation of the titanium by purging and removing hydrogen periodically through pipelines 14 and valves 13 due to change in the hydrogen pressure. The separation/hydrogenation process is a multi-step cycled procedure which includes: (i) purging hydrogen at 800-950° C. into the retort 1 at the pressure 10 kPa to 24.5 kPa through the pipeline 14, (ii) directive squeezing-out of a separated liquid phase containing magnesium and magnesium chloride from the retort 1 into an additional vessel 4, and (iii) application of alternate pressure of hydrogen to small portions of the liquid phase in PTC pores from different sides of the liquid phase which provides removal of the liquid from small pores of the PTC and fast evaporation of said liquid. Magnesium and magnesium chloride vapors go to the condenser 2 through the pipeline 3.

The separation/hydrogenation cycles "purge-in the hydrogen-degassing-purge-in the hydrogen-degassing" are accompanied by the alternative directing of the hydrogen flow from the top and from the bottom of the reactor retort 1 in order to provide a repetitive removal of liquid magnesium and magnesium chloride out of small pores of the PTC, as well as to keep the reaction mass uniformly heated during the separation process. The chlorine trap can be mounted with the gas valve gate at the entrance of retort 1.

The pressure ratio between hydrogen flows directed from the top and from the bottom of the reactor is 1:2, and the hydrogen used in the cycles "purge-in the hydrogen-degassing-purge-in the hydrogen-degassing" is recycled without an addition of fresh portions of the gas. These cycles are continued until the average magnesium content in the PTC is about 0.015-0.020 wt. % and the average chlorine content is about 0.070-0.086 wt. %.

After completion of the separation/hydrogenation process, the PTC in the retort 1 is cooled down to 600° C. or lower temperature by purging cold hydrogen having temperature 25-35° C. into the reactor 1 for speedy cooling of the block of reaction mass using multiple recirculation of hydrogen in and out of the reactor, whereby the control of temperature of the block of reaction mass is carried out by adjusting the amount of purged hydrogen. Evidently, hydrogenation of titanium is continued during cooling the sponge or sponge-like PTC due to direct contact and reaction of titanium with hydrogen. In order to finalize the process of hydrogenation, the PTC is held in the hydrogen atmosphere at 450-600° C. for 20-70 minutes using multiple recirculation of hydrogen that has a stable temperature.

The hydrogenation of the titanium sponge or sponge-like PTC is carried out at the amount of hydrogen that is significantly bigger than necessary stoichiometric ratio for this reaction.

Then, hydrogen is directed into the gas refrigerator 9 and the retort 1 is cooled down to 150-200° C. using this cold gas. The cold retort 1 is dismantled, and the hydrogenated, purified titanium compound is removed from the reactor 1. The hydrogenated titanium block is crushed and ground to obtain the powder having a predetermined particle size.

EXAMPLE

The magnesium-thermic reduction was accomplished in the reactor partially filled with liquid magnesium. The reactor had a bottom permeable by magnesium and magnesium chloride melts. The charge of 460 kg of magnesium was poured into reactor, then, it was heated to 860° C., and hydrogen was purged into the reactor at the pressure 6.5 kPa. Titanium tetrachloride was supplied on the magnesium surface with the input rate of 55 kg per hour. Total mass of the supplied $TiCl_4$ was 1340 kg, and the duration of the reduction process was 24 hours. The porous block of titanium compound having an open cavity in its center area was obtained, which contained about 40 wt. % of magnesium and about 10 wt. % of magnesium chloride.

The full thermal-vacuum separation of a PTC block from excessive magnesium and magnesium chloride was done at 880-900° C. and residual pressure of 26-266 Pa ($10^{-2}$-$10^{-3}$ mm Hg). The first cycle of separation was started by degassing the reactor down to the pressure 0.1 Pa at the rate of 1020 Pa/min, at 990° C. Then, the separation (distillation) was carried out using a multi-step cycle including: (i) the purging of hydrogen heated to 880° C. through the input pipe connected to a gas compressor into the reactor at the pressure 10.6 kPa, (ii) the directive squeezing-out of a separated liquid phase containing magnesium and magnesium chloride into the condenser retort, and (iii) the application of alternate pressure to small portions of the liquid phase in PTC pores from different sides of the liquid phase in order to remove the liquid from small pores of the titanium compound. The pressure ratio between hydrogen flows directed from the top and from the bottom of the reactor is 1:2, and the hydrogen used in the cycles "purge-in the hydrogen-degassing-purge-in the hydrogen-degassing" was recycled without an addition of fresh portions of the gas.

Then, simultaneous hydrogenation and cooling of the PTC down to 600° C. was performed in the same reactor retort by purging cold hydrogen having temperature about 30° C. into the reactor using multiple recirculation of hydrogen in and out of the reactor. The control of temperature of the block of reaction mass is carried out by manual adjusting the amount of cold hydrogen purged through a gate valve. The PTC was held in the hydrogen atmosphere at 490° C. for 60 minutes using multiple recirculation of hydrogen.

After this, hydrogen was directed into the gas refrigerator, and the reactor retort was cooled down to 150° C. using this cold gas. The retort was dismantled, and the hydrogenated porous titanium compound was removed from the reactor, crushed and ground into the powder having the particle size in the range of −100 mesh/+140 mesh (100-150 microns).

The resulting hydrogenated powder contained about 0.02 wt. % of magnesium and about 0.086 wt. % of chlorine.

COMPARATIVE EXAMPLE

The magnesium reduction process is carried out in a reactor having 1 m diameter with the input rate of $TiCl_4$ supply about 170 kg/m² per hour. The charge of 1500 kg of magnesium was poured into the reactor, then, it was heated to 800° C. Total mass of $TiCl_4$ supplied on the magnesium surface was 3550 kg, and the duration of the reduction process was 30 hours. A thin sintered block containing about 35 wt. % of magnesium and about 15 wt. % of magnesium chloride was obtained. Afterwards, a preliminary vacuum separation stage of the block was carried out for 24 hours at 1020° C. down to the content of magnesium chloride about 5 wt. % when pressure in the reactor reached $10^{-2}$ mm Hg.

The distillated block was cooled for 24 hours in argon down to 45° C., then, it was crushed for 10 hours using a hydraulic press and a disk mill in coarse titanium pieces and granules having the grain size of ≦12 mm. Then, the obtained coarse titanium was placed into the apparatus of vacuum separation where a multi-step drying process was performed for 4 hours at primary vacuum value of 0.2 mm Hg and with the temperature increase from 20 to 250° C. After the drying, the coarse titanium was subjected to the final vacuum separation stage for 30 hours at 1000° C.

The obtained sintered coarse titanium was cooled in argon down to 45° C. at pressure of 0.05-0.15 bar, and subjected to a second crushing and grinding in the hydraulic press and the disk mill to achieve the desired particle size.

The productivity of this technology is 6.2 kg/h, and electric power consumption was 7400 kW/h per 1 ton of the powder. The yield of powder having the particle size of −0.63 mm is about 20%. The remainder of the powder is coarser. Engineering characteristics of the technology are shown in the table in column 1:

The comparison of characteristics shown in the table clearly demonstrates a number of advantages of this innovative process: the resulting powder is pure, the productivity is higher, the energy consumption is lessened more than twice over, the duration of the processing cycle is decreased by the factor of 3.5. The shorter time of high-temperature stages results in significant improvement of titanium powder quality because it prevents the oxidation and nitrogenation of the metal. So, the content of oxygen and nitrogen in titanium powder is lower, which is an important indicator of titanium quality. The powder dispersion is increased, caused by the more porous and more poorly sintered structure of the reaction mass. Cooling the block in the presence of hydrogen also increases the powder quality and the yield of fine powder fractions during the hydro-metallurgical treatment.

TABLE

Comparative characteristics of conventional and innovative processes

| Characteristics | Comparative process 1 | Innovative process 2 |
|---|---|---|
| 1. Productivity of the process of Ti powder production, kg/h | 6.2 | 9.05 |
| 2. Electric power consumption, kW/h per 1 ton of powder | 7400 | 4200 |
| 3. Mass of supplied $TiCl_4$, kg | 3550 | 1340 |
| 4. Yield of powder-100 mesh (−0.15 mm), % | 20 | 86 |
| 5. Total duration of powder production, hours | 140 | 37 |
| 6. Temperature of vacuum separation, °C. | 1020 | 900 |
| 7. Concentration of chlorides in hydro-metallurgical solutions, wt. % | 1.0 | 0.086 |
| 8. Hydro-metallurgical treatment | Is necessary | Is not needed |
| 9. Cooling atmosphere | Ar | $H_2 + Ar$ |
| 10. Process characterization | Discontinued | Semi-continued |

We claim:

1. A semi-continuous magnesium-hydrogen reduction process for manufacturing of hydrogenated, purified titanium powder including the steps of:
   (a) magnesium-thermic reduction of titanium chlorides in a reactor in the temperature range of 830-880° C. in a hydrogen atmosphere at a pressure of 5-10 kPa resulting in a formation of a hollow block of a reaction mass having an open cavity in a center of the block,
   (b) heating hydrogen in a input pipe connected to a gas compressor using an electric heater and purging hot hydrogen into the reactor for heating of the reaction mass to the temperature in a range of 980-1020° C. which is optimal for a followed up vacuum separation and for maintaining a uniform temperature along the reactor sufficient to keep magnesium and magnesium chloride in a molten state,
   (c) full thermal-vacuum separation of a porous titanium compound in the reaction mass from excessive magnesium and magnesium chloride at 850-980° C. and residual pressure of 26-266 Pa ($10^{-2}$-$10^{-3}$ mm Hg), using a multi-step cycle including: (i) purging hydrogen at 800-950° C. into the reactor at a pressure 10 kPa to 24.5 kPa, (ii) directive squeezing-out of a separated liquid phase containing magnesium and magnesium chloride into an additional vessel, and (iii) application of alternate pressure to small portions of the liquid phase in pores of the porous titanium compound from different sides of the liquid phase which provides removal of the liquid phase from small pores of the titanium compound and fast evaporation of said liquid,
   (d) simultaneous controlled hydrogenation and cooling of the porous titanium compound down to 600° C. or lower temperature by purging cold hydrogen having temperature 25-35° C. into the reactor for a speedy cooling of the block of reaction mass using multiple recirculation of hydrogen in and out of the reactor, whereby a control of temperature of the block of reaction mass is carried out by adjusting the amount of purged hydrogen,
   (e) holding the hydrogenated porous titanium compound in a hydrogen atmosphere at 450-600° C. for 20-70 minutes using multiple recirculation of hydrogen that has a stable temperature,
   (f) directing hydrogen in a gas refrigerator and cooling the reactor down to 150-200° C. using this cold gas,
   (g) removing the hydrogenated porous titanium compound from the reactor,
   (h) crushing the hydrogenated porous titanium block, and
   (i) grinding the crushed hydrogenated titanium pieces into the powder having a predetermined particle size.

2. The semi-continuous magnesium-hydrogen reduction process for manufacturing of hydrogenated, purified titanium powder according to claim 1, wherein the step of full thermal-vacuum separation of the porous titanium compound in the reaction mass from liquid magnesium and magnesium chloride includes following steps:
   (a) degassing of the reactor down to a pressure 0.1 Pa at a rate not less than 1000 Pa/min and at 980-1020° C. in order to provide a first cycle of vacuum separation,
   (b) performing the separation cycles "purge in the hydrogen-degassing-purge in the hydrogen-degassing" accompanied by alternative directing the hydrogen flow from a top and from a bottom of the reactor in order to provide a repetitive removal of liquid magnesium and magnesium chloride out of small pores of the titanium compound, as well as to keep the reaction mass uniformly heated during the separation process,
   (c) a pressure ratio between hydrogen flows directed from the top and from the bottom of the reactor is 1:2, and the hydrogen used in the cycles "purge-in the hydrogen-degassing-purge-in the hydrogen-degassing" is recycled without an addition of fresh portions of the gas, and
   (d) continuing said "purge in the hydrogen-degassing-purge in the hydrogen-degassing" cycles until an average magnesium content in the porous titanium compound is from 0.015 to 0.020 wt. % and an average chlorine content in the porous titanium compound is from 0.070 to 0.086 wt. %.

3. The semi-continuous magnesium-hydrogen reduction process for manufacturing of hydrogenated, purified titanium powder according to claim 1, wherein the hydrogenation of the porous titanium compound is carried out at the amount of hydrogen that is significantly bigger than necessary stoichiometric ratio for this reaction.

4. The semi-continuous magnesium-hydrogen reduction process for manufacturing of hydrogenated, purified titanium powder according to claim 1, wherein the hydrogen-contained atmosphere is a gaseous mixture of hydrogen with argon and/or helium.

5. The semi-continuous magnesium-hydrogen reduction process for manufacturing of hydrogenated, purified titanium powder according to claim 1, wherein the magnesium-thermic reduction of titanium tetrachloride is carried out in the reactor immersed into a three-zone electric furnace; a gas-input pipe is equipped with an electric heater for heating re-circulated hydrogen and with a chlorine trap for cleaning re-circulating hydrogen; the liquid magnesium with magnesium chloride are squeezed out from the reactor into a separated vessel where they are cooled to room temperature before utilization, and after this, vapors of magnesium with magnesium chloride from the reactor after several hydrogen purging cycles are accumulated in a condenser.

6. The semi-continuous magnesium-hydrogen reduction process for manufacturing of hydrogenated, purified titanium powder according to claim 5, wherein the electric heater for heating re-circulated hydrogen comprises closely packed carbon or graphite rods in order to provide effective convective heating of the gas.

* * * * *